July 10, 1934.   J. BLACKBURN   1,965,822
CLAMP OR LOCK FOR CONNECTING A GUY WIRE AND GUARD
Filed May 4, 1932
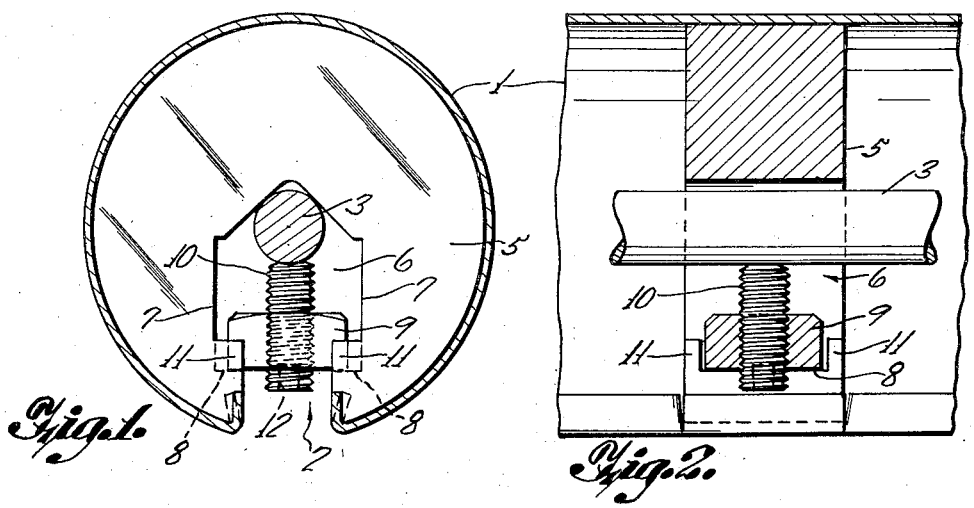
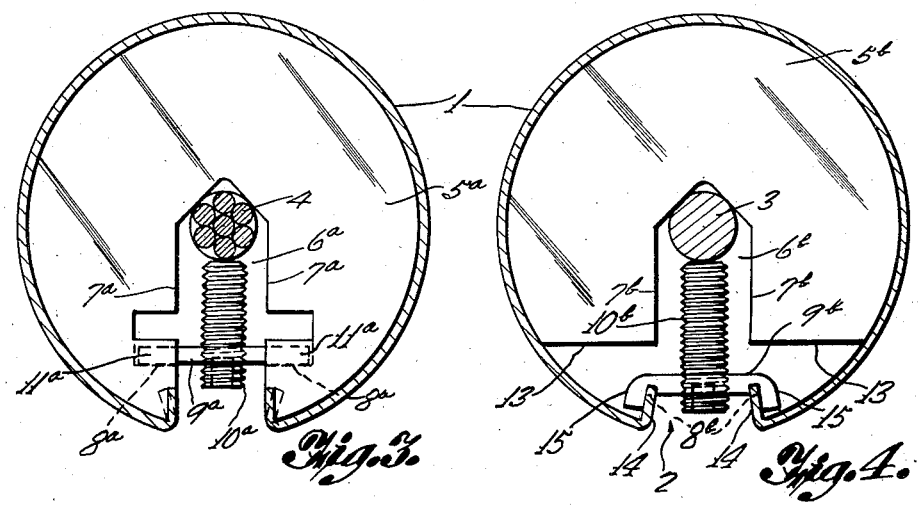
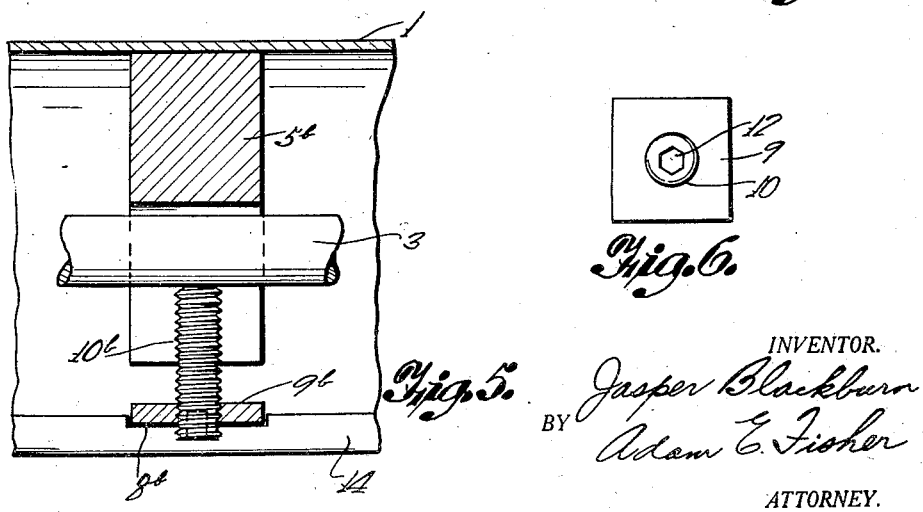
INVENTOR.
Jasper Blackburn
BY Adam E. Fisher
ATTORNEY.

Patented July 10, 1934

1,965,822

UNITED STATES PATENT OFFICE 1,965,822

CLAMP OR LOCK FOR CONNECTING A GUY WIRE AND GUARD

Jasper Blackburn, Webster Groves, Mo.

Application May 4, 1932, Serial No. 609,294

6 Claims. (Cl. 189—31.5)

This invention relates to clamps or locks for mounting guards upon guy wires or strands, or upon anchor rods, or for any similar purpose. Such installations are commonly employed in the erection or repair of telephone and telegraph lines, where the guy wires and connected anchor rods as extended from their ground anchors are for the purpose of maintaining the poles in upright position, and the guards upon the said wires or rods are for the purpose of affording general notice of the presence of such installations.

It is an important object of the present invention to provide such clamp or lock in a relatively simple, strong, durable, efficient and inexpensive form.

Another object is to provide forms of clamps of the kind referred to, the same comprising a preferably flat block adapted at its margins to engage a guard, the said block being pierced or cut transversely through one margin and through its two opposite sides by an open passage or cable-way leading into the interior of the block and ending in a cable seat adapted for engaging a guy wire or rod, there being provided also a bolt, set screw or the like with a nut or tapped bridge piece mounted thereupon, provision being made for releasably anchoring the nut or bridge piece in the assembly in such way that the bolt or set screw as passed through said nut will pass directly and axially into the cable way so that the inner end of the bolt or set screw will impinge the guy wire or rod and lockingly hold it into its seat.

A further object is to provide a simple and convenient form of lock, of few parts, including a block for mounting within the guard, the said block having a cable-way extended from the center out through one margin, and means for releasably supporting a nut and screw assembly immediately in the throat of the cable-way, for the purpose of locking a guy strand within the inner end of the cable-way.

A further object is to provide in combination a guy wire guard open along one side for the transverse insertion of a guy wire, a block mounted upon the guard, the said block having a cable-way cut transversely thereinto through one margin, the mouth of the cable-way being aligned with the open side of the guard, a tapped bridge piece spanning the open side of the guard oppositely to the mouth of the said block, with the ends of the bridge piece having a bearing at the opposed margins of the open side of the guard, and a set screw or bolt passed through the said tapped bridge piece axially into said cable-way of the block.

With the aforesaid objects and advantages in view, together with such other objects as may be hereinafter developed, attention is directed to the accompanying drawing as illustrating certain preferred embodiments and structural features of my invention, and wherein Figure 1 is an elevation of one form of my improved clamp or lock as mounted within a section of guy wire guard, a section of anchor rod being shown engaged by the lock.

Figure 2 is a vertical transverse section through the assembly shown in Figure 1.

Figure 3 is a view similar to that of Figure 1, but showing a slightly modified form of the clamp, and showing a guy strand mounted therein.

Figure 4 is a view similar to those of Figures 1 and 3, showing certain other structural modifications.

Figure 5 is a vertical transverse section through the assembly of Figure 4.

Figure 6 is a detail showing in plan a form of set screw employed in the practise of this invention, the same being inserted through its nut, and the head thereof being provided with an angular socket for engaging the bit of an operating tool.

The present drawing illustrates a guard 1 of any suitable material such as sheet metal, of the form of a parted tube, whereby is provided a longitudinally extended opening 2, through which an anchor rod 3 or guy strand 4 may be transversely inserted within the guard. Within the guard are mounted in spaced relation a number of flat, disk-like blocks of any suitable material, one of the blocks being shown at 5. Each said block is formed with a passage or cable-way 6 extended through one margin into the interior of the block and cutting through both sides or faces thereof. In practise, the blocks are mounted within the guard with their cable-ways 6 aligned with the opening 2, and the guard thus equipped is mounted upon the anchor rod or guy strand with the said openings directed downwardly, the rod or strand passing up into the cable-ways of the several blocks.

The present invention has to do with the method of locking the blocks upon the rod or strand as thus positioned within the cable-ways. For this purpose, I contemplate mounting directly in the throat of the cable-way of each block a removable nut or tapped bridge piece and then passing a threaded bolt or set screw through the same axially up into the cable-way, where the inner end of the bolt or screw will bear against the anchor rod or guy strand and releasably lock same to its seat at the inner closed end of the cable-way. As shown in Figures 1 and 2, this is accomplished by laterally recessing the side walls 7 of the cable-way, so as to form shoulders 8 upon which two opposite margins of the nut 9 may be seated and have a bearing, and then passing the set screw 10 through the nut and up against the rod 3. The nut is locked against rotation by the walls 7, and it may be additionally locked against slippage through the block by means of ears 11 extended up above the ends of the shoulders 8 at each side of the block. The screw is turned up by means of a tool (not shown) having an angular point or bit for inserting in the angular socket 12 in the head of the screw.

The modification shown in Figure 3, shows in lieu of the nut 9, an elongated and tapped bridge piece 9a, the ends thereof having a bearing upon the shoulders 8a formed in the walls 7a at the sides of the cable-way 6a cut in the block 5a, the ears 11a being also provided for the purpose above stated. This form is of advantage where it is desirable to provide an extra large or wide cable-way, as the bridge piece may be as long as necessary. The screw 10a is inserted in the manner above described. In the assembly shown in Figures 4 and 5, the skirt of the block 5b is cut clear away, as shown at 13, transversely of the cable-way 6b, the walls 7b of which are brought straight down. The margins of the opening 2 of the guard 1 are then turned up inwardly, as shown at 14, and are recessed on their edges to form opposed, depressed seats or shoulders 8b immediately below the block 5b and in lateral alignment with the cable-way 6b. A special elongated bridge piece 9b is then provided to span the opening 2 athwart the cable-way 6b, the ends thereof being turned down to form toes 15 adapted to set over the inner faces of the depressed shoulders 8b. This bridge piece is likewise tapped medially to engage the screw 10b, in manner as described for the preceding structures. In this form, the screw is thus braced from the parted margins of the opening 2 of the guard, instead of being braced from shoulders formed upon the block itself, as in the preceding structures. The effect is practically the same so far as locking the rod or strand into its seat is concerned, but in this latter form, the guard itself is drawn in as an element of the novel combination or assembly, which is not true as to the others. The toes 15 of the bridge piece 9b effectively lock the margins of the guard against spreading apart under the strain of the screw pressing up against the guy strand.

It is thought that from the foregoing descriptions, the use and operation of the several forms of clamps or locks will be fully understood, and while my invention and the several structural features thereof are here shown and described as applied to and upon a guard of the parted tube type, it is understood that the same may as readily be applied to other forms of guards by suitably shaping the outer margins of the blocks so as to adapt same to fit such other forms of guards. My invention is not concerned with the outer configuration of the margins of the blocks, but only with the arrangements for removably anchoring a screw assembly athwart the cable-ways cut or formed in such blocks. The blocks thus may be mounted within or on the guard in any desired or conventional manner. It will be noted that the essential parts of the assemblies shown comprise merely the channeled blocks, with means for supporting nut and screw assemblies within the throats thereof, some of such nut and screw assemblies being of conventional form.

And while I have herein described certain generic and specific aspects of my invention, it is understood that the structural details thereof may be varied at will, not departing from the spirit of the invention as defined in the appended claims.

I claim:

1. In a structure of the kind described, in combination, a guy wire guard open along one side, a block mounted within said open side of the guard, the said block having a cable-way aligned with the opening of the guard and leading through one margin of the block into its interior, a tapped element aligned with said block and supported at its ends from the opposite margins of the opening of the guard, and a screw passed through said tapped element into said cable-way of said block.

2. In a structure of the kind described, in combination, a guy wire guard, a block connected with the guard, the said block having a cable-way leading through one margin into its interior, a tapped element aligned with said block and supported at its ends from said guard, and a screw passed through said tapped element axially into the cable-way of said block.

3. In a structure of the kind described, in combination, a guy wire guard open along one side and having the parted margins thereof turned up inwardly, a block seated within the open side of the guard, the said block having a cable-way opening out in alignment with the open side of the guard and leading into the interior of the block, there being a clearance between the portions of the block at the mouth of the cable-way and the adjacent and upturned margins of the guard, a bridge piece spanning the open side of the guard in alignment with the said block, the ends of the bridge piece being turned to form toes for engaging the upturned margins of the guard opening, the said bridge piece being tapped centrally, and a screw passed through said tapped bridge piece axially into the cable-way of the block.

4. The combination with a guy wire guard of the form of a parted tube, of a block mounted within and supporting the guard, the said block being formed with a cable-way extended through one margin and positioned oppositely to the opening of the guard, a nut removably supported from the assembly transversely of the mouth of the cable-way, and a press screw passed through said nut and adapted to axially penetrate said cable-way.

5. The combination with a guy wire guard of the form of a parted tube, of a block mounted within and supporting the guard, the said block being formed with a cable-way extended through one margin and positioned oppositely to the opening of the guard, shoulders formed on the opposite walls of the cable-way, a nut removably supported from said shoulders transversely within the cable-way, and a press screw passed through said nut and adapted to axially penetrate said cable-way.

6. The combination with a guy wire guard of the form of a parted tube, of a block mounted within and supporting the guard, the block being formed with a cable-way opening out through one margin oppositely to the opening of the guard, a tapped element removably supported from the walls of the cable-way transversely of the cable-way, and a press screw passed through said tapped element and adapted to axially penetrate said cable-way.

JASPER BLACKBURN.